(12) United States Patent
Clarke

(10) Patent No.: US 9,334,844 B2
(45) Date of Patent: May 10, 2016

(54) RECIPROCATING INTERNAL COMBUSTION ENGINE

(71) Applicant: Motiv Engines LLC, Boulder, CO (US)

(72) Inventor: John M. Clarke, Woodsboro, MD (US)

(73) Assignee: Motiv Engines LLC, Boulder, CO (US)

( * ) Notice: Subject to any disclaimer, the term of this patent is extended or adjusted under 35 U.S.C. 154(b) by 412 days.

(21) Appl. No.: 14/039,432

(22) Filed: Sep. 27, 2013

(65) Prior Publication Data
US 2015/0090224 A1 Apr. 2, 2015

(51) Int. Cl.
*F02M 69/46* (2006.01)
*F02B 33/22* (2006.01)
*F02B 41/08* (2006.01)
*F02B 3/06* (2006.01)

(52) U.S. Cl.
CPC .............. *F02M 69/46* (2013.01); *F02B 3/06* (2013.01); *F02B 33/22* (2013.01); *F02B 41/08* (2013.01)

(58) Field of Classification Search
CPC ..... F02M 25/03; F02M 25/022; F02M 69/46; F02B 41/08; F02B 3/06; F02B 33/22; F02B 31/04; F02B 47/02
See application file for complete search history.

(56) References Cited

U.S. PATENT DOCUMENTS

| | | | |
|---|---|---|---|
| 2,255,925 A | 9/1941 | Heylandt | |
| 2,768,617 A * | 10/1956 | Tierney, Jr. | ............. F02B 31/04 123/188.7 |
| 3,267,661 A | 8/1966 | Petrie | |
| 4,281,626 A * | 8/1981 | Fishe | ...................... F02B 47/02 123/25 C |
| 5,566,549 A | 10/1996 | Clarke | |
| 8,065,991 B2 * | 11/2011 | Kuroki | ................... F01M 13/00 123/1 A |
| 8,381,691 B2 | 2/2013 | Clarke | |
| 8,397,685 B2 | 3/2013 | Lowi | |
| 2010/0300385 A1 | 12/2010 | Durrett | |

FOREIGN PATENT DOCUMENTS

DE          717771 C     2/1942

OTHER PUBLICATIONS

U.S. Appl. No. 13/483,101, filed May 30, 2012, Clarke.
U.S. Appl. No. 13/483,117, filed May 30, 2012, Clarke.
U.S. Appl. No. 13/483,172, filed May 30, 2012, Clarke.
International Search Report and Written Opinion for PCT/US2014/057350 dated Dec. 1, 2014.

* cited by examiner

*Primary Examiner* — Hieu T Vo
(74) *Attorney, Agent, or Firm* — Sheehan Phinney Bass & Green PA

(57) ABSTRACT

A highly-efficient, yet simply constructed internal combustion engine includes an intake cylinder to accommodate intake and pre-compression of an oxidizing agent, a combustion cylinder to accommodate a further compression of the oxidizing agent, an injection and ignition of fuel, and a partial expansion of combustion gases produced by the ignition of fuel; and an exhaust cylinder to accommodate a further expansion of the combustion gases and subsequent exhausting of the further expanded combustion gases. A reciprocating piston is inside each of the intake, combustion and exhaust cylinders and a crankshaft is coupled to the reciprocating pistons. A first transfer passage facilitates flow of the pre-compressed oxidizing agent from the intake cylinder to the combustion cylinder and a second transfer passage facilitates flow of the partially-expanded combustion gases from the combustion cylinder to the exhaust cylinder.

21 Claims, 3 Drawing Sheets

_US 9,334,844 B2_

RECIPROCATING INTERNAL COMBUSTION ENGINE

FIELD OF THE INVENTION

This disclosure relates to a reciprocating internal combustion engine and, more particularly, relates to a high-efficiency, reciprocating, internal combustion engine.

BACKGROUND

A reciprocating internal combustion engine is a heat engine that uses one or more reciprocating pistons to convert the energy of a combusting fuel into a rotating motion.

In a typical reciprocating internal combustion engine, the expansion of the high-temperature and high-pressure gases produced by the combustion of fuel inside a cylinder applies force to drive a piston inside the cylinder. This force moves the piston over a distance thereby transforming the chemical energy of the fuel into useful mechanical energy.

SUMMARY OF THE INVENTION

In one aspect, a highly-efficient, yet simply constructed internal combustion engine includes an intake cylinder to accommodate intake and pre-compression of an oxidizing agent, a combustion cylinder to accommodate a further compression of the oxidizing agent, an injection and ignition of fuel, and a partial expansion of combustion gases produced by the ignition of fuel; and an exhaust cylinder to accommodate a further expansion of the combustion gases and subsequent exhausting of the further expanded combustion gases. A reciprocating piston is inside each of the intake, combustion and exhaust cylinders and a crankshaft is coupled to the reciprocating pistons. A first transfer passage facilitates flow of the pre-compressed oxidizing agent from the intake cylinder to the combustion cylinder and a second transfer passage facilitates flow of the partially-expanded combustion gases from the combustion cylinder to the exhaust cylinder.

In another aspect, a method includes: pre-compressing an oxidizing agent with a reciprocating piston inside an intake cylinder of an internal combustion engine; further compressing the pre-compressed oxidizing agent, injecting and igniting fuel into the further compressed oxidizing agent, and accommodating a partial expansion of resulting combustion gases to drive a reciprocating piston inside a combustion cylinder of the internal combustion engine; and enabling the combustion gases to further expand inside an exhaust cylinder of the internal combustion engine and expelling the further expanded combustion gases out of the exhaust cylinder with a reciprocating piston inside the exhaust cylinder. The reciprocating pistons inside the intake, combustion and exhaust cylinders are coupled to a crankshaft of the internal combustion engine.

In some implementations, the engine employs the Brayton cycle spread across three separate cylinders.

In some implementations, one or more of the following advantages are present.

For example, a highly-efficient engine that has a relatively simple design and construction may be provided. In addition, the engine may have a compact size relative to conventional compression-ignition engines. Moreover, the engine may have the ability to burn natural gas by utilizing a high overall compression ratio that is not achievable in conventional engines.

Other features and advantages will be apparent from the description and drawings, and from the claims.

Relative terms, such as "lower," "upper," "horizontal," "vertical,", "above", "below", "up", "down", "top" and "bottom" as well as derivative thereof (e.g., "horizontally," "downwardly," "upwardly," etc.) should be construed to apply only to certain orientations (e.g., a particular orientation being described or shown in a drawing being discussed). These relative terms are used for convenience only and do not require that the apparatus be constructed or operated in a particular orientation.

The dead center in an engine is the position of a piston in which it is farthest from, or nearest to, the crankshaft. The former is known as top dead center (TDC) and the latter is known as bottom dead center (BDC). These phrases, top dead center and bottom dead center, are used throughout the present disclosure and should be construed broadly in manner consistent with their respective meanings.

BRIEF DESCRIPTION OF THE DRAWINGS

Like reference numerals in the figures refer to like elements.

DETAILED DESCRIPTION

Figure 1:
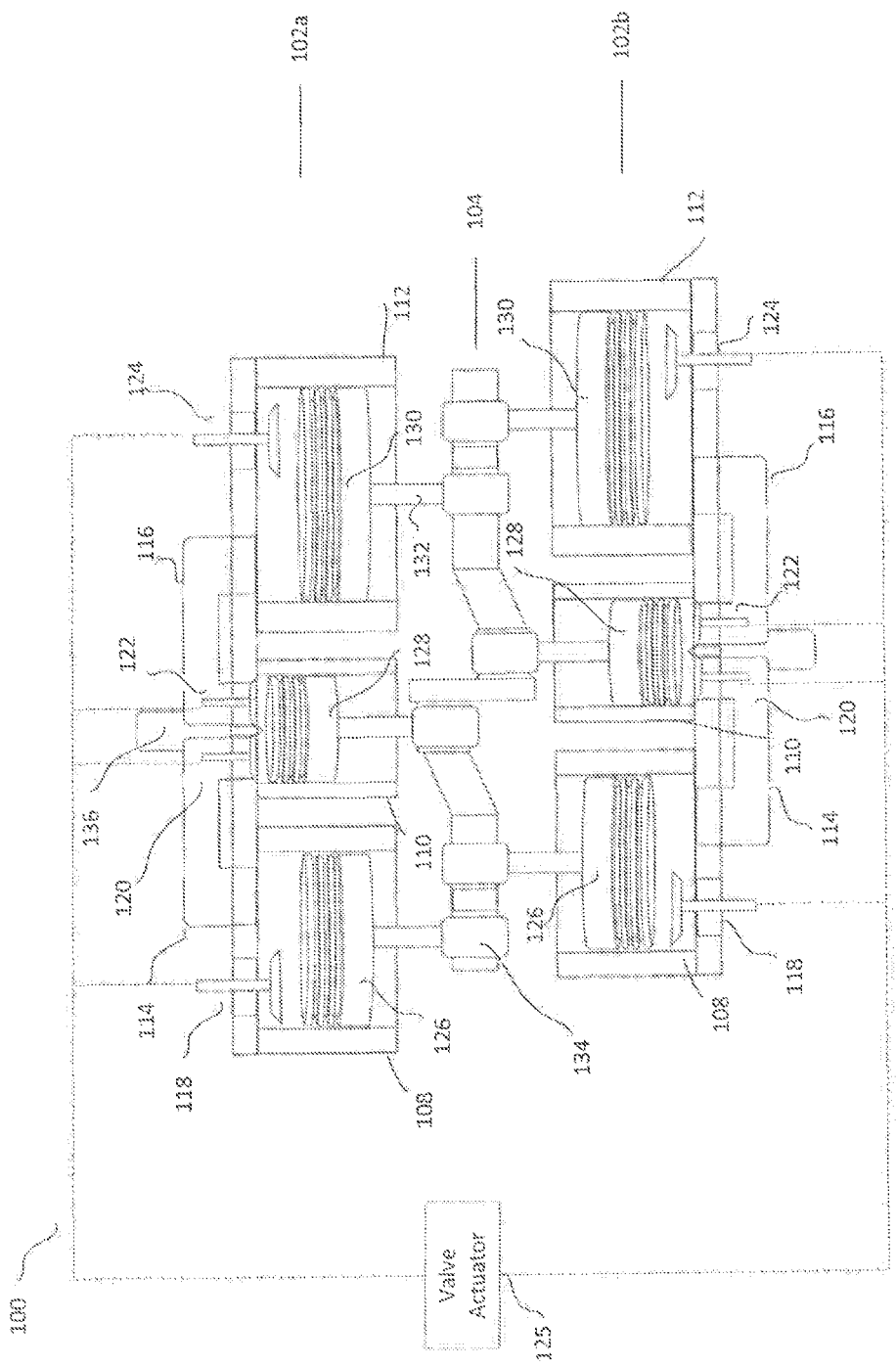
FIGS. 1-3 are partial cross-sectional views showing one implementation of a reciprocating internal combustion engine at various stages of the engine's operation.
Figure 2:
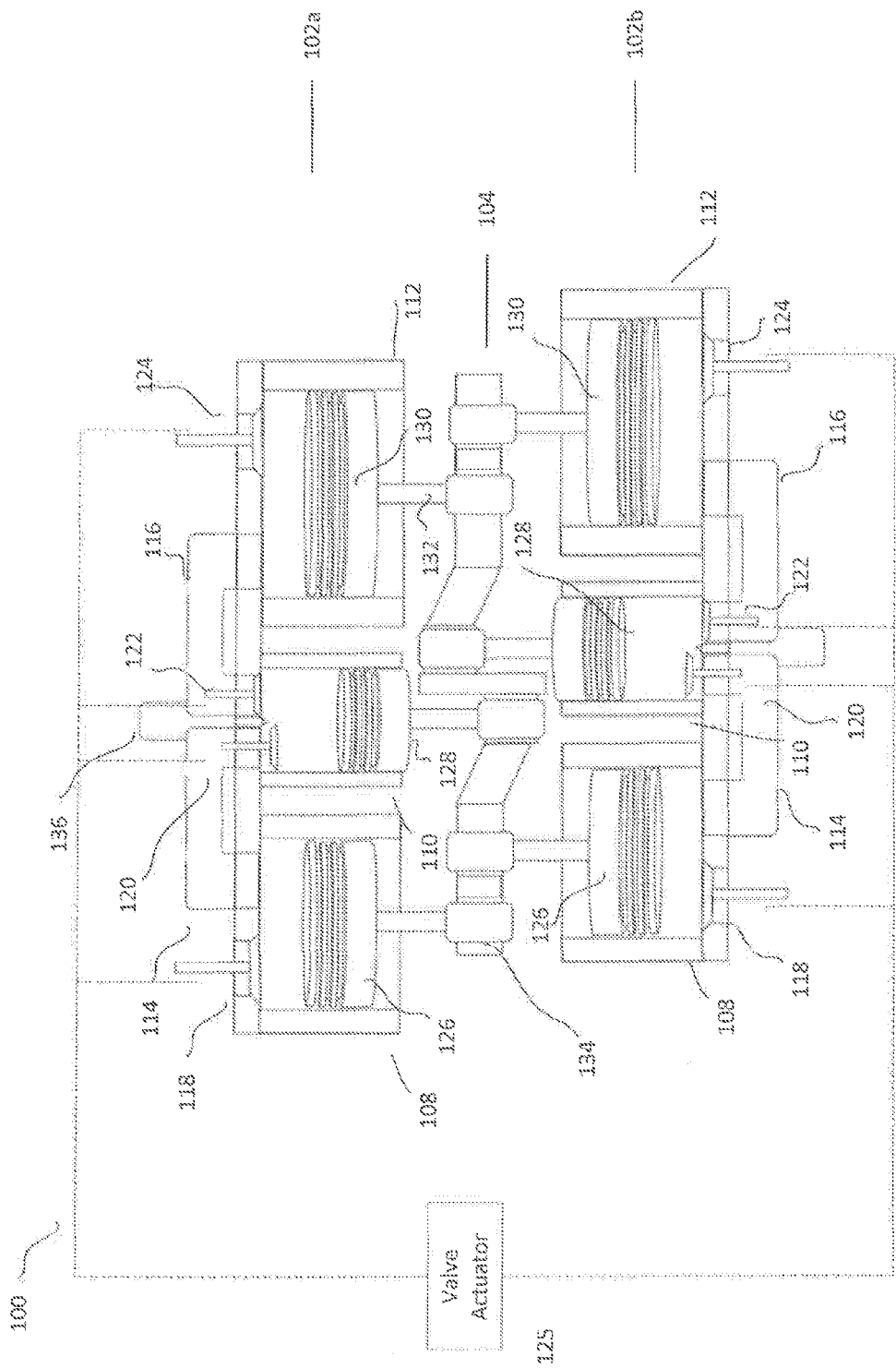
Figure 3:
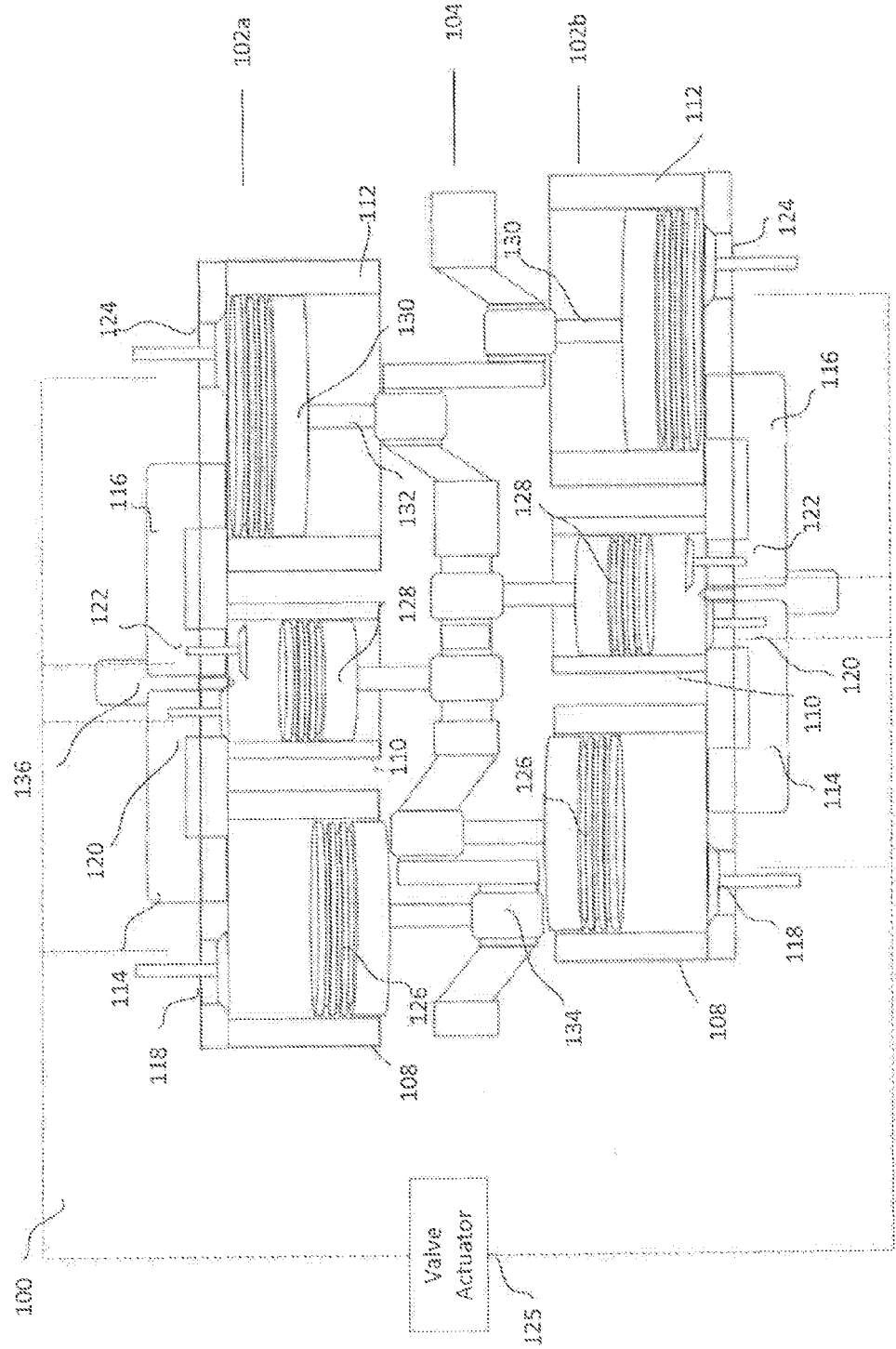

The engine 100 shown in FIGS. 1-3 has two power-generating sections 102a and 102b, each of which is configured to deliver mechanical energy to a common crankshaft 104. Power-generating section 102a includes three in-line cylinders that are on a first side of the common crankshaft 104 and power-generating section 102b includes three in-line cylinders that are on a second side of the common crankshaft 104.

As discussed in detail herein, the three cylinders in each power-generating section 102a, 102b cooperate to accommodate the steps required to conduct one complete engine operating cycle. In general terms, these steps include intake, compression, combustion, expansion and exhaust. More particularly, as discussed herein, the steps required to conduct one complete engine operating cycle (i.e., intake, compression, combustion, expansion and exhaust) are spread out among the three cylinders in each power-generating section 102a, 102b.

In each power-generating section 102a, 102b, the three cylinders include: an intake cylinder 108, a combustion cylinder 110 and an exhaust cylinder 112. A first transfer passage 114 extends between the intake cylinder 108 and the combustion cylinder 110. A second transfer passage 16 extends between the combustion cylinder 110 and the exhaust cylinder 112.

An intake valve 118 is provided to regulate the flow of fluid (e.g., air) into the intake cylinder 108. A first transfer valve 120 is provided to regulate the flow of fluid (e.g., air) through the first transfer passage 114 from the intake cylinder 108 to the combustion cylinder 110. A second transfer valve 122 is provided to regulate the flow of fluid (e.g., combustion gases) through the second transfer passage 116 from the combustion cylinder 110 to the exhaust cylinder 112. An exhaust valve 124 is provided to regulate the flow of fluid (e.g., exhaust gases) out of the exhaust cylinder 112.

In the illustrated implementation, each valve 118-124 is poppet that consists of a hole at the top of one of the cylinders, and a tapered plug on the end of a shaft (also known as a valve stem). The portion of the hole where the plug mates to it is called the valve seat. In a typical implementation, the shaft would guide the plug portion by sliding through a valve guide (not shown).

According to the illustrated implementation, in each power-generating section 102a, 102b, the intake valve 118 is at the top of the intake cylinder 108, the first and second transfer valves 120, 122 are at the top of the combustion cylinder 110 and the exhaust valve 124 is at the top of the exhaust cylinder 112.

In a typical implementation, the valves are controlled by a valve actuator 125. More particularly, the valve actuator is configured to control (e.g., open and close) the intake valve, the first transfer valve, the second transfer valve and the exhaust valve at appropriate times in the engine's operating cycle to support appropriate engine operations.

There is a reciprocating piston inside each cylinder. More particularly, there is a reciprocating intake piston 126 inside each intake cylinder 108; there is a reciprocating combustion piston 128 inside each combustion cylinder 110; and there is a reciprocating exhaust piston 130 inside each exhaust cylinder 112. The reciprocating pistons are arranged such that each piston reciprocates inside one of the intake, combustion and exhaust cylinders in a direction that is substantially perpendicular to an axis of the crankshaft. Moreover, each reciprocating piston in a particular one of the power-generating sections 102a, 102b is substantially parallel to the other reciprocating pistons in its power-generating section. This type of arrangement is not required, of course. Instead of being parallel, the reciprocating pistons in the particular power-generating sections 102a, 102b can be arranged radially around the crankshaft, for instance. Other types of arrangements are possible as well.

In the illustrated implementation, the three cylinders 108-112 in each power-generating section 102a, 102b have different bore sizes. For example, in each power-generating section 102a, 102b, the combustion cylinder 110 has the smallest bore size, the exhaust cylinder 112 has the largest bore size, and the intake cylinder 108 has a bore size that is between the bore size of the combustion cylinder 110 and the bore size of the exhaust cylinder 112. Each piston has a diameter that corresponds to the bore size of its associated cylinder.

In certain implementations, the ratios of intake piston diameter to combustion piston diameter to exhaust piston diameter to piston stroke is: 2.15:1:3.37:1.18. Of course, each of these dimensions can vary (e.g., approximately +/−% 15, or more) relative to one or more of the other specified dimensions. How they vary may depend, for example, on the specific desired engine operational characteristics of the particular engine.

Each piston 126-130 is coupled to the common crankshaft 104 via a respective connecting rod 132 and connecting rod bearings 134. The common crankshaft 104 is configured to translate the reciprocating, linear motion of the pistons into a rotational motion and vice versa.

In each power-generating section 102a, 102b, there is a fuel injection mechanism arranged to inject fuel into combustion cylinder 110 at an appropriate point in the engine's operating cycle. In the illustrated implementation, the fuel injection mechanisms are fuel injectors 134. Notably, the intake cylinders 108 and the exhaust cylinders 112 do not have any fuel injectors or other fuel injection mechanisms. This is because, in each power-generating section 102a, 102b, fuel is directly injected only into the combustion cylinder 110, not into the intake 108 or exhaust 112 cylinders.

In some implementations, fuel may be injected into the first transfer passage between the intake cylinder and the combustion cylinder. This may be done instead of or in addition to injecting fuel directly into the combustion cylinder. This dual-injection technique may be useful, for example, in applications where two different fuels are used. In some implementations, it may be desirable to inject fuel into the intake cylinder. This, too, may be done instead of or in addition to injecting fuel directly into the combustion cylinder and/or the first transfer passage.

The illustrated engine is a compression-ignition engine (i.e., the engine uses the heat of compression to initiate ignition for burning fuel that has been injected into the engine. However, in some implementation, there may be a different source of ignition (e.g., a spark plug) configured to ignite the fuel that is injected into the combustion cylinder 110. Notably, in engines that utilize spark-ignition, the intake cylinders 108 and the exhaust cylinders 112 would not have any source of ignition, such as a spark plug. This is because, in each power-generating section 102a, 102b of a similar, spark-ignition, type of engine, fuel would be ignited only in the combustion cylinder 110, not in the intake 108 or exhaust 112 cylinders.

A discussion of how the illustrated engine 100 operates follows. This discussion focuses primarily on power-generating section 102a. It should be understood, however, that power-generating section 102b has similar physical and operational characteristics as power-generating section 102a and operates in similar and coordinated manner with power-generating section 102a to cooperatively deliver useable mechanical energy to crankshaft 104.

In general, and as discussed in further detail below, the intake cylinder 108 accommodates intake and pre-compression of an oxidizing agent (e.g., air); the combustion cylinder 110 accommodates further compression of the oxidizing agent, fuel injection and ignition of the injected fuel and a partial expansion of the resulting combustion gases; and the exhaust cylinder 112 accommodates a further expansion of the combustion gases and ultimately exhausting the expanded combustion gases from power-generating section 102a.

In FIG. 1, oxidizing agent (e.g., is being drawn into the intake cylinder 108, fuel combustion has just begun or is about to begin in the combustion cylinder 110 and expanded combustion gases are being expelled from the exhaust cylinder 112.

The intake valve 118 is in an open position and the reciprocating piston inside the intake cylinder 108 is moving in a downward direction from top dead center to bottom dead center thereby drawing air into the intake cylinder 108. In some implementations, the intake valve 118 remains open for most, if not all, of the time that the reciprocating piston inside the intake cylinder 108 is moving from top dead center to bottom dead center.

The exhaust valve 124 is in an open position and the reciprocating piston inside the exhaust cylinder 112 is moving in an upward direction from bottom dead center to top dead center thereby expelling expanded combustion gases from the exhaust cylinder. 122 In some implementations, the exhaust valve 124 remains open for most, if not all, of the time that the reciprocating piston inside the exhaust cylinder 112 is moving from bottom dead center to top dead center.

Both transfer valves 120, 122 are in a closed position and the reciprocating piston inside the combustion cylinder 110 is at approximately top dead center. In a typical implementation, this would be just after the fuel has been injected (by fuel injector 136) and ignited (e.g., by heat of compression). The resulting combustion gases inside the combustion cylinder 110 are just starting to expand in the combustion cylinder 110 and drive the reciprocating piston inside the combustion cylinder 110 in a downward direction from top dead center (as shown in FIG. 1) toward bottom dead center. In some implementations, the transfer valves 120, 122 remain closed for most, if not all, of the time that the reciprocating piston inside the combustion cylinder 110 is moving from top dead center to bottom dead center.

The crankshaft 104, which is coupled to the reciprocating pistons inside the intake cylinder, combustion cylinder and exhaust cylinder, is translating the linear motion of the reciprocating piston in the combustion cylinder 110 into a rotational motion and, at the time depicted in FIG. 1, driving the reciprocating pistons in the intake cylinder 108 and exhaust cylinder 112.

In FIG. 2, the illustrated engine components are configured as they would be approximately 90 degrees after their configuration shown in FIG. 1.

The intake valve 118 and the first transfer valve 120 are in a closed position and the reciprocating piston inside the intake cylinder 108 has just passed bottom dead center and started moving in an upward direction from bottom dead center to top dead center thereby compressing the charge of air that previously was drawn into the intake cylinder 108.

Since the charge of air being compressed in the intake cylinder 108 in FIG. 2 is further compressed in the combustion cylinder 110 at a subsequent point in time, the compression that occurs in the intake cylinder 108 is referred to in some places herein as a pre-compression.

In some implementations, the intake valve 118 remains closed for most, if not all, of the time that the reciprocating piston inside the intake cylinder 108 is moving from bottom dead center to top dead center. Additionally, in some implementations, the first transfer valve 120 remains closed for part of the time that the reciprocating piston inside the intake cylinder 108 is moving from bottom dead center to top dead center.

The reciprocating piston inside the combustion cylinder 110 is approximately at the center of its expansion stroke and is moving in a downward direction from top dead center to bottom dead center.

The second transfer valve 122 between the combustion cylinder 110 and the exhaust cylinder 112 has just opened. At this point, the reciprocating piston inside the exhaust cylinder 112 is at or very near top dead center and the volume of space inside the exhaust cylinder 112 (i.e., between the top of the reciprocating piston inside the exhaust cylinder 112 and the cylinder head) is quite small. This advantageously minimizes blow down losses between the combustion cylinder 110 and the exhaust cylinder 112. In some implementations, the second transfer valve 122 will close when the reciprocating piston inside the combustion cylinder reaches close to bottom dead center. This means that there is generally some retained combustion gas. Just as the reciprocating piston inside the combustion cylinder reverses direction, the first transfer valve between the intake and combustion cylinders opens and the intake piston pushes a fresh charge of air in.

The exhaust valve 124 is in a closed position and the exhaust piston is just beginning or is about to begin its expansion stroke, moving from top dead center to bottom dead center. In some implementations, the exhaust valve 124 remains closed for most, if not all, of the exhaust piston's expansion stroke, moving from top dead center to bottom dead center. In some implementations, the exhaust valve 124 opens when the reciprocating piston inside the exhaust cylinder is close to, at or just past bottom dead center at the end of its expansion stroke.

With the engine configured as shown in FIG. 2, the combustion gases can expand to drive the reciprocating piston inside the combustion cylinder 110 and to drive the reciprocating piston inside the exhaust cylinder 112. The crankshaft 104, which is coupled to the reciprocating pistons inside the intake cylinder, combustion cylinder and exhaust cylinder, is translating the linear motion of the reciprocating pistons inside the combustion cylinder 110 and inside the exhaust cylinder 112 into a rotational motion and driving the reciprocating piston inside the intake cylinder 108.

A number of embodiments have been described. Nevertheless, it will be understood that various modifications may be made without departing from the spirit and scope of the present disclosure. For example, the relative bore sizes of the intake, combustion and exhaust cylinders may differ from what has been disclosed herein. In some implementations, the bore sizes of these three cylinders may be substantially the same as one another.

The specific timing of various engine operations (e.g., valve timing, fuel injection timing, etc.) may vary.

The intake, first and second transfer, and exhaust valves may be of a different style, size and/or arrangement than what is disclosed herein. For example, the valves may be sleeve valves instead of poppet valves. There may be two, three, four, five or more valves per cylinder.

In addition, the engine may include any number of cylinders as long as that number is a multiple of three (3). So, for example, the engine may include three cylinders, six cylinders, nine cylinders, twelve cylinders, fifteen cylinders, eighteen cylinders, etc. Each set of three cylinders would include an intake, combustion and exhaust cylinder.

The engine can be arranged with an in-line engine design, (e.g., a straight engine with all of the cylinders placed in a single row), a U-engine design (e.g., two separate straight engines with crankshafts linked by a central gear), a V-engine design (e.g., two banks of cylinders at an angle, most commonly 60 or 90 degrees), a flat engine design (e.g., two banks of cylinders directly opposite each other on either side of the crankshaft), and any other type of engine design.

The relative order of cylinders (i.e., intake, combustion and exhaust) may differ from what has otherwise been disclosed herein. So, for example, the intake cylinder 108 may be physically positioned between the combustion cylinder 110 and the exhaust cylinder 112.

The valve actuator 125 may include a camshaft that revolves at some fixed speed relative to the crankshaft speed (e.g., half-speed). The camshaft may be driven in any convenient manner, including for example, by chain, gear or toothed belt driven from the crankshaft, and can be located, for example, in the engine's crankcase or in the cylinder head. Valves could also be driven electrically or hydraulically. Valve timing could vary depending on engine operating conditions.

The physical arrangement of the transfer passages may differ. Moreover, the physical positions of the transfer valves in connection with those transfer passages may differ as well. For example, in some implementations, the first transfer valve 120 may be at the beginning of the first transfer passage 114 in the cylinder head of the intake cylinder 108. Likewise, in some implementations, the second transfer valve may be at the end of the second transfer passage 116 in the cylinder head of the exhaust cylinder 112.

The various components disclosed can have a variety of shapes and sizes.

The techniques, components and systems disclosed herein can be adapted for use in connection with a variety of different engine styles including, for example, engines that run on diesel fuel or other heavy fuels, engines that run on gasoline or alcohols and engines with or without spark ignition.

Engines implementing the techniques disclosed herein can be used in connection with a wide variety of applications including, for example, aircraft auxiliary power units, alternative light vehicle engines, marine engines, on-highway truck engines, military unmanned aerial vehicles, tactical vehicle engines, stationary power generation, and aircraft engines.

The engine can be adapted to include any number of optional accessories (e.g., turbochargers, superchargers, etc.) that might be used in a conventional engine to enhance efficiency.

Other implementations are within the scope of the claims.

What is claimed is:

1. An internal combustion engine comprising:
   an intake cylinder to accommodate intake and pre-compression of an oxidizing agent;
   a combustion cylinder to accommodate a further compression of the oxidizing agent, an injection and ignition of fuel, and a partial expansion of combustion gases produced by the ignition of fuel; and
   an exhaust cylinder to accommodate a further expansion of the combustion gases and subsequent exhausting of the further expanded combustion gases;
   a reciprocating piston inside each of the intake, combustion and exhaust cylinders;
   a crankshaft coupled to the reciprocating pistons;
   a first transfer passage to facilitate flow of the pre-compressed oxidizing agent from the intake cylinder to the combustion cylinder; and
   a second transfer passage to facilitate flow of the partially-expanded combustion gases from the combustion cylinder to the exhaust cylinder,
   wherein, during operation, a reciprocating piston inside the combustion cylinder is approximately at the center of its expansion stroke and is moving in a downward direction from top dead center to bottom dead center, when a second transfer valve between the combustion cylinder and the exhaust cylinder has just opened.

2. The internal combustion engine of claim 1, wherein the combustion cylinder has a smaller bore than the first cylinder.

3. The internal combustion engine of claim 1, wherein the exhaust cylinder has a larger bore than the intake cylinder.

4. The internal combustion engine of claim 1, further comprising a fuel injector configured to inject the fuel into the combustion cylinder.

5. The internal combustion engine of claim 4, wherein there are no fuel injectors configured to inject fuel into the intake cylinder or the exhaust cylinder.

6. The internal combustion engine of claim 1, further comprising an ignition source to ignite the fuel in the combustion cylinder.

7. The internal combustion engine of claim 1, further comprising:
   an intake valve operable to regulate a flow of the oxidizing agent into the intake cylinder;
   a first transfer valve operable to regulate a flow of the pre-compressed oxidizing agent through the first transfer passage from the intake cylinder to the combustion cylinder;
   a second transfer valve operable to regulate a flow of the partially-expanded combustion gases through the second transfer passage from the combustion cylinder to the exhaust cylinder; and
   an exhaust valve operable to regulate a flow of the further expanded combustion gases out of the exhaust cylinder.

8. The internal combustion engine of claim 7, further comprising a valve actuator operable operably coupled to the intake valve, the first transfer valve, the second transfer valve and the exhaust valve.

9. The internal combustion engine of claim 8, wherein the valve actuator is operable to:
   open the intake valve so that the oxidizing agent can be drawn into the intake cylinder during at least part of the time that the reciprocating piston inside the intake cylinder is moving between top dead center and bottom dead center;
   close the intake valve to allow the oxidizing agent inside the intake cylinder to be pre-compressed by the reciprocating piston inside the intake cylinder moving between bottom dead center and top dead center;
   open the first transfer valve after the reciprocating piston inside the intake cylinder has pre-compressed the oxidizing agent to allow the pre-compressed oxidizing agent to flow through the first transfer passage from the intake cylinder to the combustion cylinder;
   close the first transfer valve to allow the pre-compressed oxidizing agent to be further compressed by the reciprocating piston inside the combustion cylinder moving from bottom dead center to top dead center;
   open the second transfer valve after the after fuel combustion has occurred inside the combustion cylinder to allow the partially-expanded combustion gases to flow through the second transfer passage from the combustion cylinder to the exhaust cylinder; and
   close the second transfer valve after at least some of the partially-expanded combustion gases have flowed through the second transfer passage from the combustion cylinder to the exhaust cylinder; and
   open the exhaust valve after the partially-expanded combustion gases have further expanded in the exhaust cylinder to allow the further expanded combustion gases to flow out of the exhaust cylinder while the reciprocating piston inside the exhaust cylinder is moving from bottom dead center to top dead center.

10. The internal combustion engine of claim 1, wherein the crankshaft is configured to rotate about an axis and each piston reciprocates inside one of the intake, combustion and exhaust cylinders in a direction that is substantially perpendicular to the axis of the crankshaft.

11. A method comprising:
    pre-compressing an oxidizing agent with a reciprocating piston inside an intake cylinder of an internal combustion engine;
    further compressing the pre-compressed oxidizing agent, injecting and igniting fuel into the further compressed oxidizing agent, and accommodating a partial expansion of resulting combustion gases to drive a reciprocating piston inside a combustion cylinder of the internal combustion engine; and
    enabling the combustion gases to further expand inside an exhaust cylinder of the internal combustion engine and expelling the further expanded combustion gases out of the exhaust cylinder with a reciprocating piston inside the exhaust cylinder,
    wherein the reciprocating pistons inside the intake, combustion and exhaust cylinders are coupled to a crankshaft of the internal combustion engine, and wherein, during operation, the reciprocating piston inside the combustion cylinder is approximately at the center of its expansion stroke and is moving in a downward direction from top dead center to bottom dead center, when a second transfer valve between the combustion cylinder and the exhaust cylinder has just opened.

12. The method of claim 11, further comprising:
opening an intake valve to allow the oxidizing agent to be drawn into the intake cylinder while the reciprocating piston inside the first cylinder is moving between top dead center and bottom dead center.

13. The method of claim 12, further comprising:
closing the intake valve to allow the oxidizing agent inside the intake cylinder to be pre-compressed by the reciprocating piston inside the first cylinder moving between bottom dead center and top dead center.

14. The method of claim 13, further comprising:
opening a first transfer valve after the reciprocating piston inside the first cylinder has pre-compressed the oxidizing agent to allow the pre-compressed oxidizing agent to flow from the intake cylinder to the combustion cylinder.

15. The method of claim 14, further comprising:
closing the first transfer valve to allow the pre-compressed oxidizing agent to be further compressed by the reciprocating piston inside the combustion cylinder moving from bottom dead center to top dead center.

16. The method of claim 15, further comprising:
injecting the fuel into the combustion cylinder after further compressing the oxidizing agent.

17. The method of claim 16, further comprising igniting the injected fuel in the combustion cylinder.

18. The method of claim 17, further comprising:
opening a second transfer valve after the after fuel combustion has occurred inside the combustion cylinder to allow the partially-expanded combustion gases to flow from the combustion cylinder to the exhaust cylinder.

19. The method of claim 18, further comprising:
closing the second transfer valve after at least some of the partially-expanded combustion gases have flowed from the combustion cylinder to the exhaust cylinder.

20. The method of claim 19, further comprising:
opening an exhaust valve after the partially-expanded combustion gases have further expanded in the exhaust cylinder to allow the further expanded combustion gases to flow out of the exhaust cylinder while the reciprocating piston inside the exhaust cylinder is moving from bottom dead center to top dead center.

21. The method of claim 10, wherein the combustion cylinder has a smaller bore than the intake cylinder, and wherein the exhaust cylinder has a larger bore than the intake cylinder.

\* \* \* \* \*